(12) United States Patent
Arai et al.

(10) Patent No.: US 6,758,328 B2
(45) Date of Patent: Jul. 6, 2004

(54) CHAIN FOR THREE-DIMENSIONAL TRANSFER LINE

(75) Inventors: Takeshi Arai, Tokyo (JP); Hiroaki Kase, Tokyo (JP)

(73) Assignee: Yamakyu Chain Co., Ltd., Tokyo (JP)

( * ) Notice: Subject to any disclaimer, the term of this patent is extended or adjusted under 35 U.S.C. 154(b) by 0 days.

(21) Appl. No.: 10/257,388

(22) PCT Filed: Jan. 30, 2002

(86) PCT No.: PCT/JP02/00719

§ 371 (c)(1),
(2), (4) Date: Oct. 18, 2002

(87) PCT Pub. No.: WO02/064461

PCT Pub. Date: Aug. 22, 2002

(65) Prior Publication Data

US 2003/0141172 A1 Jul. 31, 2003

(30) Foreign Application Priority Data

Feb. 14, 2001 (JP) .......................... 2001-36728

(51) Int. Cl.[7] .............................................. B65G 17/06
(52) U.S. Cl. .................... 198/852; 198/844.1; 198/850; 198/851
(58) Field of Search ............................. 198/844.1, 850, 198/851, 852

(56) References Cited

U.S. PATENT DOCUMENTS

| | | | |
|---|---|---|---|
| 4,664,253 A | 5/1987 | Fahrion | |
| 4,895,248 A | 1/1990 | Wahrén | |
| 6,173,832 B1 * | 1/2001 | Cockayne | 198/852 |
| 6,209,716 B1 * | 4/2001 | Bogle et al. | 198/852 |
| 6,247,583 B1 * | 6/2001 | Coen et al. | 198/852 |
| 6,250,459 B1 * | 6/2001 | Coen et al. | 198/852 |
| 6,347,699 B1 * | 2/2002 | Ramsey | 198/852 |

FOREIGN PATENT DOCUMENTS

| | | |
|---|---|---|
| JP | 53-51592 | 12/1978 |
| JP | 2-145217 | 12/1990 |

* cited by examiner

*Primary Examiner*—Richard Ridley
(74) *Attorney, Agent, or Firm*—Greenblum & Bernstein, P.L.C.

(57) ABSTRACT

There is provided a conveyor chain for use in a three-dimensional conveyor line, in which a plurality of chain links each with a top plate provided on a link body thereof are connected endlessly to each other by shaft pins for three-dimensional conveyance of products, a projecting head portion of a rearward one of two adjacent chain links is disposed between a pair of leg portions of a frontward adjacent link, a shaft pin is penetrated through the projecting head portion so that the rearward chain link can freely be pivoted vertically and horizontally about the shaft pin, the top plate includes a front plate portion and rear plate portion, each portion formed defining its boundary as a semicircular line whose center is laid nearly at the center of the projecting head portion, the rear plate portion is integral with the rear upper portion of the link body while the front plate portion is disposed on the front upper portion of the link body, a bearing block is received in a bearing space, the bearing block is engaged on the shaft pin so that the rear plate portion can be pivoted horizontally in relation to the front plate portion. Since there takes place no gap between the front edge of the rear plate portion and rear edge of the front plate portion, the conveyor chain thus constructed can convey products more stably without thrust-up, stalling or overturn of them.

5 Claims, 7 Drawing Sheets

CHAIN FOR THREE-DIMENSIONAL TRANSFER LINE

FIELD OF THE INVENTION

The present invention relates to a conveyor chain for three-dimensional conveyor line, in which a plurality of chain links each having a top plate provided on a link body thereof is connected endlessly to each other by shaft pins to three-dimensionally convey such appropriate products as beverages, foods, pharmaceuticals, and other similar products while supporting them stably on the top plates.

BACKGROUND ART

Heretofore, there have been provided various types of conveyor chains in which each chain link has a top plate provided thereon. The conventional conveyor chain links include, for example, a slat type conveyor chain apparatus used in a conveyor disclosed in the Japanese Published Unexampled Utility Model Application No. 145217 of 1990. The conveyor chain link known from the disclosure has a slat provided thereon, and a plurality of the chain links is made up into the conveyor. The slat has a plurality of projections formed at the front end thereof, and as many cuts formed at the rear end thereof as the projections. The cuts are formed in positions corresponding to the projections and larger than the projections. In the conveyor, the chain links are connected endlessly to each other with the rear end of a preceding one of two successive chain links being coupled to the front end of the following one with a constant gap between the cut of the preceding slat and projection of the following slat. Each of the chain links thus connected together is pivotable vertically and horizontally in relation to preceding and following ones.

Also, there has been provided a conveyor line chain in which a plurality of chain links each having a generally crescent top plate provided thereon is successively connected to each other.

In the above-mentioned slat type convey chain apparatus used in the conveyor, however, when the conveyor travels in a curved direction, the gap between the adjacent slats (top plates) is increased outside the center line of the curved track and a part of a product being conveyed is likely to fall into the increased gap. For this reason, the wider the slat (top plate), the more difficult it is to stably carry the product.

Also, when the conveyor line made up of the chain links each with the generally crescent top plate travels in a curved direction, the interval between the adjacent top plates will not be increased outside the center line of the curved track; however, when the conveyance shifts from horizontal to oblique (inclined or declined) or from oblique to horizontal, the lateral edges of the adjacent top plates are moved vertically more than the central portions and the product carried on the conveying surface (top plates) is thrust up as the case may be. Therefore, the conveyor made up of such chain links cannot be relied upon for stable conveyance of products.

Further, in the conveyor chain made up of the chain links each having the generally crescent top plate, when each of the chain links is strongly pulled forward while the tension of the entire chain is high for example, the front and rear edges of the top plate are likely to be lifted up slightly and also engagement of each of the chain links on a sprocket which drives the chain causes a noise.

DISCLOSURE OF THE INVENTION

The present invention has an object to overcome the above-mentioned drawbacks of the conventional art by providing a conveyor chain for three-dimensional conveyor line, which has a relatively wide conveying surface and can convey products without thrust-up, stalling or overturn of any of them during oblique conveyance or when each chain link engages on a sprocket.

The present invention has another object to provide a conveyor chain for three-dimensional conveyor line, in which the gap between two adjacent top plates is constant and small during conveyance in a linear or curved direction and which can make three-dimensional conveyance of products stably and smoothly.

The present invention has still another object to provide a conveyor chain for three-dimensional conveyor line, which is relatively simple in construction, easy to produce, and suitable for mass production, and can be produced and operated at low costs.

The above object can be attained by providing a conveyor chain for three-dimensional conveyor line, in which a plurality of chain links S each with a top plate provided on a link body thereof is connected endlessly to each other by shaft pins D for three-dimensional conveyance of products, wherein:

the link body includes a projecting head portion 1 projecting forward and having a bearing space 5 defined by a curved inner wall, and a pair of leg portions 2 projecting reward;

the leg portions 2 in pair of one chain link have the shaft pin D penetrated and fixed across them and the projecting head portion 1 of a next chain link S is disposed between the pair of leg portions 2;

the projecting head portion 1 is shaped to freely be pivoted vertically about, and longitudinally of, the shaft pin D;

the top plate includes a front plate portion B1 and rear plate portion A2, each portions formed defining their boundary a semicircular line whose center is laid nearly at the center of the projecting head portion 1 in such a manner that the front plate portion B1 has a generally semicircular shape while the rear plate portion A2 is concave at the front end thereof correspondingly to the semicircular shape of the front plate portion B1;

the rear plate portion A2 is integral with the rear upper portion of the link body while the front plate portion B1 has on the lower front side thereof a bearing block projecting downward and which is received in the bearing space 5 of the projecting head portion 1; and the bearing block has the shaft pin D penetrated through it so that the bearing block is prevented from being disengaged from the bearing space 5 and the rear plate portion A2 can be pivoted laterally of the front plate portion B1.

the rear plate portion A2 is integral with the rear upper portion of the link body while the front plate portion B1 has on the lower front side thereof a bearing block projecting downward and which is received in the bearing space 5 of the projecting head portion 1; and the bearing block has the shaft pin D penetrated through it so that the bearing block is prevented from being disengaged from the bearing space 5 and the rear plate portion A2 can be pivoted laterally of the front plate portion B1.

When the conveyor chain constructed as above travels horizontally in a curved direction, the rear plate portion A2 of one chain link S is pivoted laterally of the front plate portion B1 with no gap (or a gap which is constant and extremely small, if any) between the front edge of the rear plate portion A2 and the rear edge of the front plate portion B1, so that the product can be conveyed more stably.

Especially, even in case the top plate is shaped to greatly overhang laterally of the link body, since there takes place no gap (a gap which is constant and extremely small) between the front edge of the rear plate portion A2 and the rear edge of the front plate portion B1 when the chain travels horizontally in a curved direction, the front and rear plate portions B1 and A2 provide a rather wide conveying surface which permits to convey the product more stably.

In addition, in case the chain travels obliquely (inclined or declined), the rear edge of the rear plate portion A2 of the preceding one of two adjacent chain link S is turned an appropriate angle in relation to the front edge of the front plate portion B1 of the following chain link S, and the front plate portion B1 and rear plate portion A2 of the same chain link S tilt together without thrust-up, stalling or overturning of the bottom of the product on the plate portions B1 and A2. Further, since the chain link S is relatively simple in construction, so the chain according to the present invention is relatively simple in construction, easy to produced, and suitable for mass production, and can be produced and operated at low costs.

As set forth in claim 2, it is desirable that each of the chain link S should have projections 10 formed at the front edge of the front plate portion B1 and recesses 7 formed in the rear edge of the rear plate portion A2 correspondingly to the projections 10 to receive the projections 10, respectively.

Because of the above construction of the chain link S, the square shaped wave gap between the rear plate portion A2 of the forward one of two adjacent chain links S and the front plate portion B1 of the rearward adjacent chain link S shall be defined straightly and continuously, so that the product being conveyed is not easily be stalled or overturned. Thus, the conveyor chain can convey the products more stably.

Also, as set forth in claim 3, it is desirable that the bearing block formed on the lower side of the front plate portion B1 should be divided into two parts, front and rear, the rear bearing block B2 be formed integrally with the front plate portion B1 while the front bearing block C should be formed separately from the front plate portion B1 and front bearing block B2.

Because of the above bearing block construction, the front bearing block C may be formed from various materials and any one of the bearing blocks C thus made is selected for an intended use. For example, during operation of the conveyor chain, the front bearing block C is applied with a considerably large load from the surrounding front inner wall surface of the bearing space 5 of the projecting head portion 1 and the shaft pin D and also in sliding contact with the front inner wall surface of the bearing space 5 and thus it is easily abraded. So, it should preferably be formed from a highly durable, strong or abrasion-resistant material, so that the entire chain link S can be highly durable, strong or abrasion-resistant.

The highly durable, strong or abrasion-resistant material is relatively expensive, but since it suffices to from only the front bearing block C from such a material, the production cost for the entire chain can be reduced and chain links S having the front bearing blocks formed from various materials can freely be combined to build widely applicable conveyor chains.

Particularly, since the bearing block consists of the rear and front bearing blocks B2 and C, the force of the front bearing block C will not have any influence on the rear bearing block B2 and front plate portion B1 while the force from the shaft pin D is transmitted to the front bearing block C even in case the entire chain is under a high tension and the chain links S are pulled strongly frontward. Thus the front and rear edges of the front plate portion B1 will not be lifted up.

Since the rear bearing block B2 is formed integrally with the front plate portion B1, the latter may be formed from a material which is not so durable or strong. For example, in case the top plate B itself is formed from rubber or the like, the product being conveyed can stably be carried on the front plate portion B1 without slipping thereon.

Further, as set forth in claim 4, the front bearing block C should desirably be formed from a low-abrasion or high oil-content material, so that it can smoothly move in the bearing space 5 and in relation to the shaft pin D and thus it has a higher durability. The entire chain link S will have a longer service life and the conveyor chain made up of such chain links S can be maintained more easily.

Furthermore, as set forth in claim 5, the front plate portion B1 and rear bearing block B2 should desirably be formed from a high coil-content material or an appropriately elastic material, so that a sprocket driving the chain and the rear bearing block B2 can be put in smooth contact with each other without occurrence of any noise when the rear bearing block B2 is put into contact with the sprocket which drives the chain.

BEST MODE FOR CARRYING OUT THE INVENTION

Figure 1:
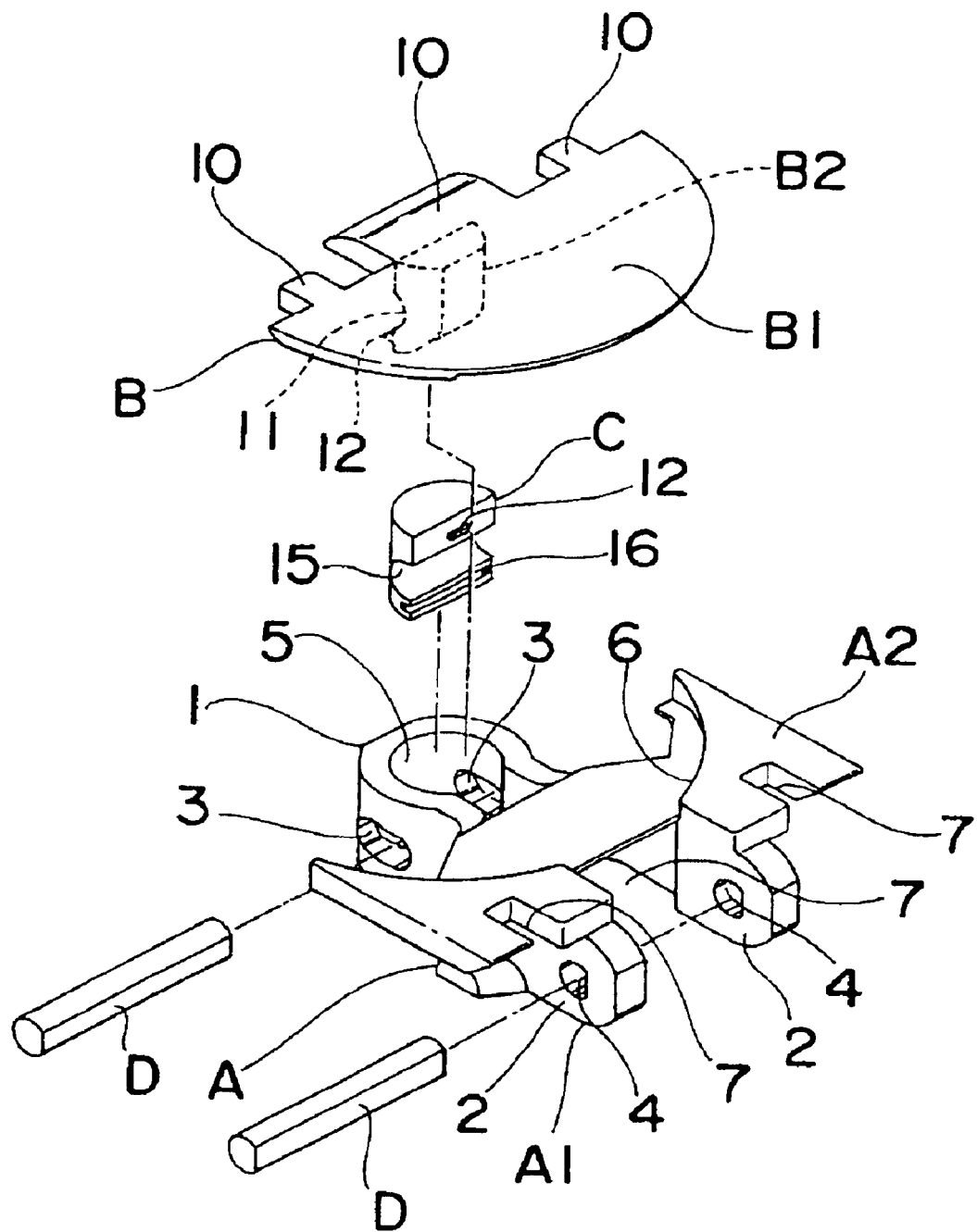
FIG. 1 is an exploded perspective view of an embodiment of the three-dimensional conveyor line-oriented chain according to the present invention.
Figure 2:
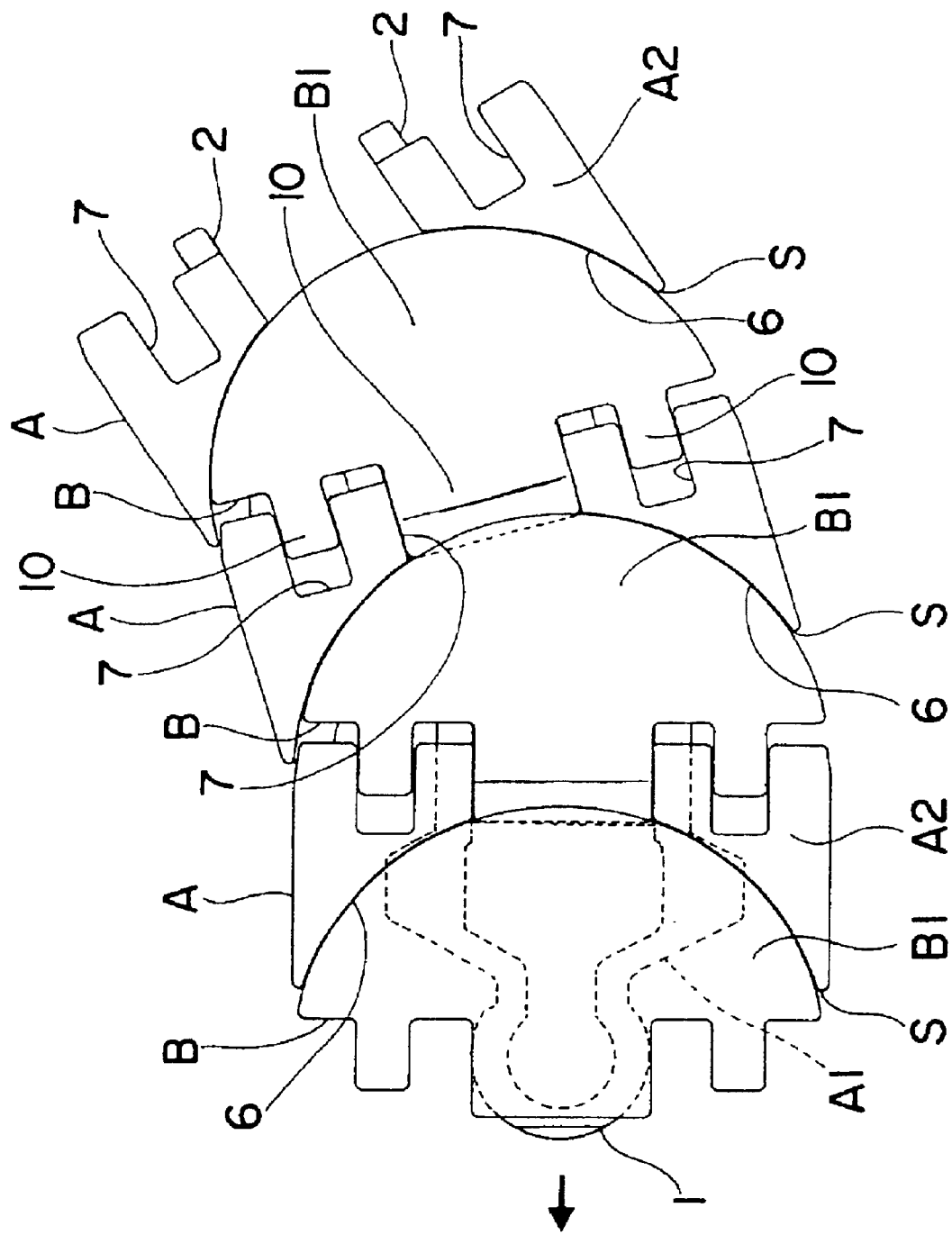
FIG. 2 is a plan view of the conveyor chain in FIG. 1.
Figure 3:
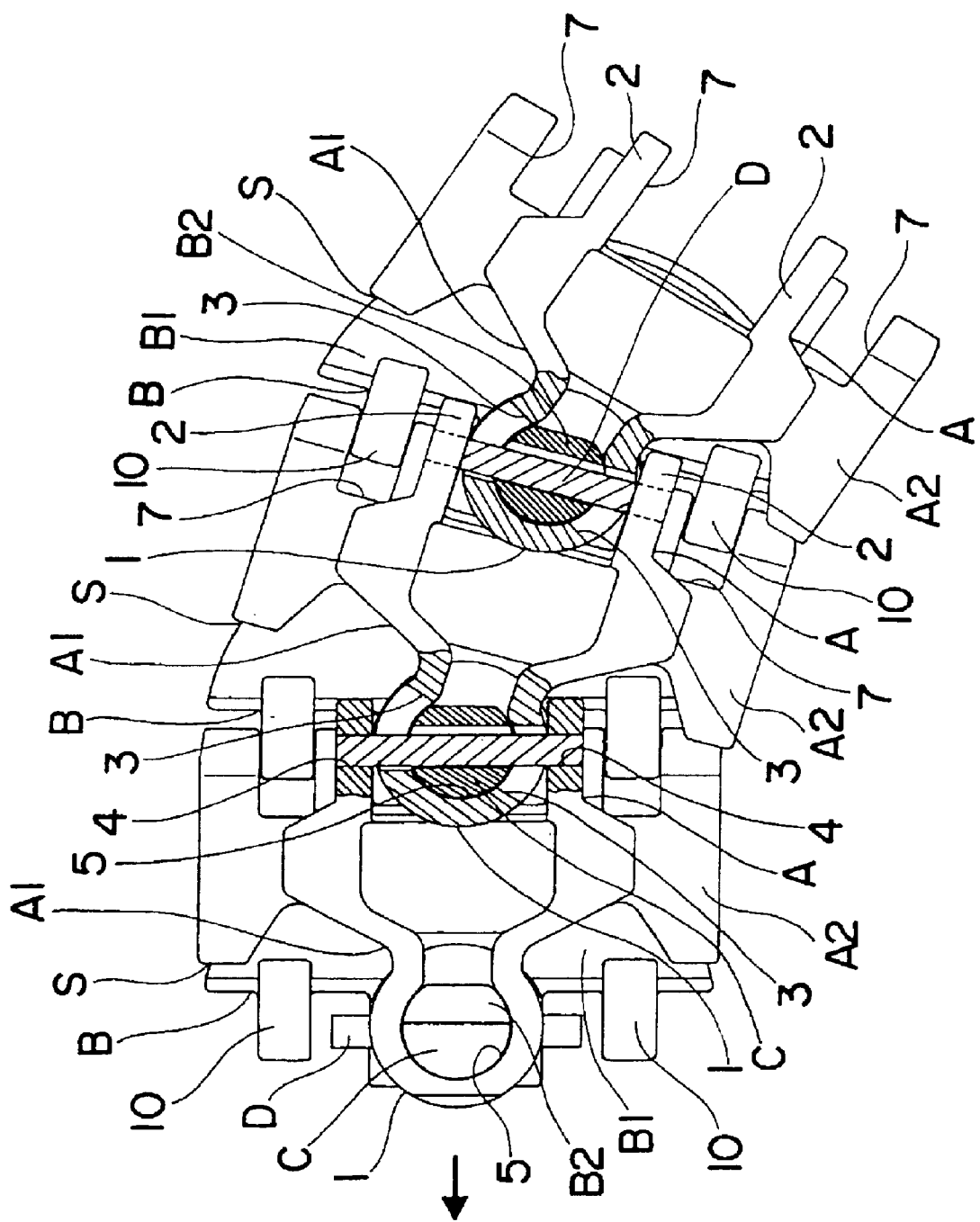
FIG. 3 is a partially cut-off bottom view of the conveyor chain in FIG. 1.
Figure 4:
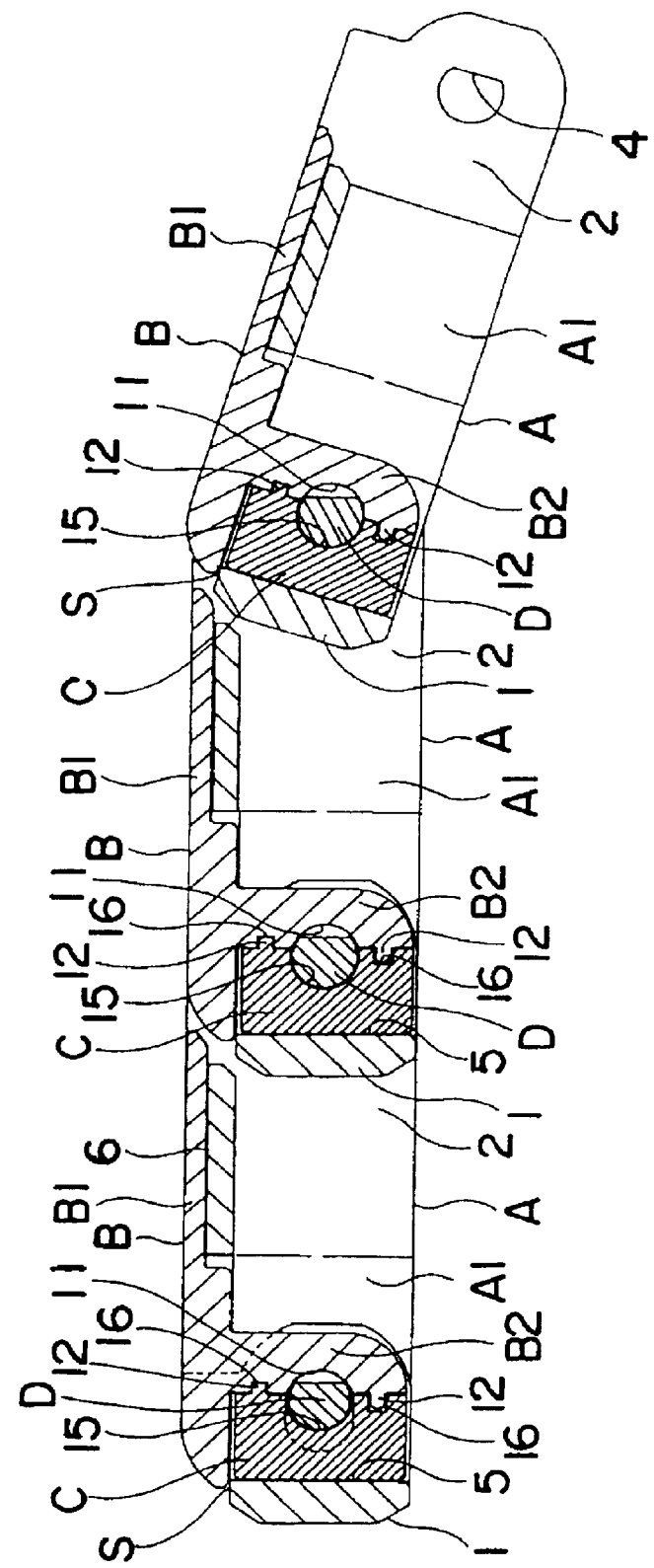
FIG. 4 is an axial-sectional, side elevation of the conveyor chain in FIG. 1.
Figure 5:
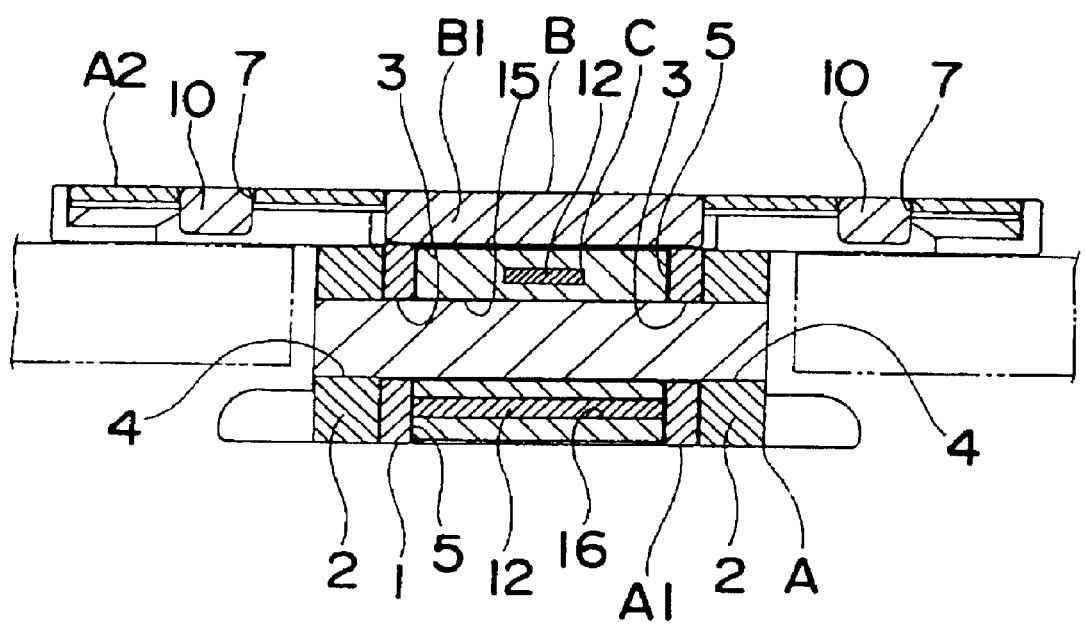
FIG. 5 is also an axial-sectional, front view of the conveyor chain in FIG. 1
Figure 6:
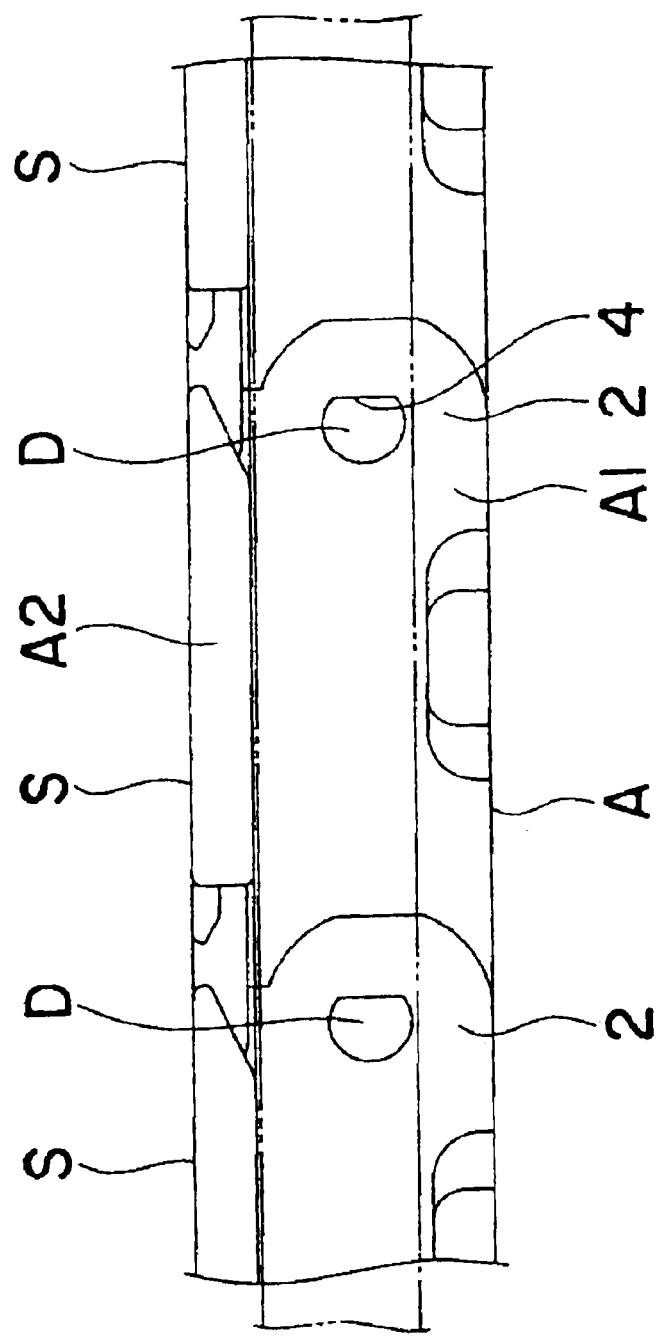
FIG. 6 is a side elevation of the conveyor chain in FIG. 1.

An embodiment of the conveyor chain for three-dimensional conveyor line according to the present invention will be described herebelow with reference to the accompanying drawings.

The conveyor chain for three-dimensional conveyor line according to the present invention is directed for use to construct a three-dimensional conveyor line, which three-dimensionally conveys beverages, foods, pharmaceuticals or other appropriate products, for example, by endlessly coupling a plurality of chain links S, each having provided on the top a link body thereof a top plate whose upper surface provides a carrying surface for a product, to each other with shaft pins D.

Each chain link S includes, for example, of a head portion 1 projecting forward and formed from a curved wall having a generally C-like contour when viewed from above, and a pair of leg portions 2 projecting rearward from the right and left ends of the projecting head portion 1.

Between the pair of leg portions 2 of one chain link S, there is disposed the projecting head portion 1 of another chain link S. The projecting head portion 1 has horizontally elongated holes 3 formed laterally across the curved wall thereof, and each of the pair of leg portions 2 has a through-hole 4 formed in the rear end portion thereof. The shaft pin D is penetrated through the through-holes 4 in the leg portions 2 of one chain link S and elongated holes 3 in the head portion 1 of another chain link S combined with the one chain link S. These holes 3 and 4 are so shaped that the shaft pin D is to be loose-fitted therein. Thus, of adjacent chain links S, a following one can be pivoted about the shaft pin D vertically (up and down in a plane perpendicular to the axis of the shaft pin D) and also longitudinally of the shaft pin D (to the right and left of the longitudinal center of the shaft pin D in a plane including the axis of the shaft pin).

Note that the inner surface of the generally C-contoured curved wall of the head portion 1 defines a bearing space 5.

The top plate of the chain link S is shaped to largely overhang laterally of the link body. It includes a front plate portion B1 formed like a generally semicircular disc, and a rectangular rear plate portion A2 cut off at the front end thereof correspondingly to the semicircular shape of the front plate portion B1, consisting a boundary of the semicircular disc of B1 and the corresponding semicircular waved portion of A2 whose center is laid nearly at the center of the head portion 1.

The rear plate portion A2 is formed integrally with the rear upper portion of the link body of the chain link S. The front plate portion B1 has a projecting bearing formed on the front bottom thereof. When the front plate portion B1 is placed on the front upper portion of the link body, the bearing is received in the bearing space 5 of the projecting hear portion 1. The bearing is engaged on the shaft pin D which will thus prevent the bearing from being disengaged upward from inside the bearing space 5.

Further, the bearing is so shaped that it can be pivoted vertically about the shaft pin D (up and down in a plane perpendicular to the axis of the shaft pin D) but cannot be pivoted longitudinally of the shaft pin D (to the right and left of the longitudinal center of the shaft pin D in a plane including the axis of the shaft pin D). Thus, the rear plate portion A2 can be pivoted laterally of the front plate portion B1.

That is, when the conveyor line made up of the chain links S constructed as above according to the present invention, travels horizontally in a curved direction, the rear plate portion A2 can be pivoted laterally of the front plate portion B1 with no gap (or with a stable and extremely small gap, if any) between the front edge of the rear plate portion A2 and rear edge of the front plate portion B1.

Specifically, even if the top plate is designed to largely overhang laterally of the link body as in the embodiment shown, the conveyor line can travel horizontally in a curved direction with no gap (or a stable and extremely small gap, if any) between the front edge of the rear plate portion A2 and rear edge of the front plate portion B1.

On the other hand, when the conveyor travels on a slope, ascending or descending, the front edge of the front plate portion B1 of the following chain link S is turned a predetermined angle in relation to the rear edge of the rear plate portion A2 of the preceding chain link S, so that the front and rear plate portions B1 and A2 of the same chain link S will slant together.

In addition, the bearing of the front panel portion B1 may be divided in two parts, front and rear. The rear part, namely, rear bearing block B2, is formed integrally with the front plate portion B1, while the front part, that is, front bearing block C, is formed separately from the front plate portion B1. The front bearing block C may be formed from a low-abrasion or high oil-content material, for example, and the rear bearing block B2 and front plate portion B1 be formed from a high oil-content or appropriately elastic material, for example.

More specifically, when the conveyor line is in operation, the front bearing block C is considerably pressed between the front inner surface of the bearing space 5 of the projecting head portion 1 and the shaft pin D and also the front bearing block C is in sliding contact with the front inner surface of the bearing space 5. Therefore, the front bearing block C is easily abraded. To avoid this, the front bearing block C is formed from a highly durable, strong material, low-abrasion material or high oil-content material.

The reason why the bearing consists of the two portions, the rear bearing block B2 and front bearing block C, is that when each chain link S is strongly pulled forward under a high tension of all the chain links included in the conveyor line, the force from the shaft pin D will be transmitted to the front bearing block C but the force from the front bearing block C will not have any direct influence on the rear bearing block B2 and front plate portion B1, so that the front and rear edges of the rear bearing block B2 of the preceding one of adjacent chain links S will be little lifted up.

On the other hand, in case the rear bearing block B2 and front plate portion B1 are formed from a high oil-content or appropriately elastic material, for example, the rear bearing block B2 can be put in smooth and noise-free contact or mesh with a sprocket which drives the chain.

Also, in case the front plate portion B1 (and rear bearing block B2) is formed from a highly friction-resistant material such as a rubber, the friction between the product and upper surface of the front plate portion B1 is so large that even the product being conveyed obliquely can be carried stably without slipping on the upper surface of the front plate portion B1.

The front plate portion B1 has formed at the front edge thereof a plurality of generally rectangular projections 10, and the rear plate portion A2 has formed at the rear edge thereof a plurality of generally rectangular recesses 7 corresponding to the projections 10 and in which the projections 10 are received respectively.

Namely, the rear plate portion A2 of a chain link S and the front plate portion B1 of a following chain link S define a generally square wave-like gap between them, so that any product will not easily be caught or turned over between the plate portions A2 and B1.

Note that the central one of the projections 10 of the front plate portion B1 is formed wider than the other ones while the central one of the recesses 7 of the rear plate portion A2 is formed wider than the other ones. The central projection 10 of the front plate portion B1 is gradually smaller in thickness, namely, descending-sloped, toward the upper front edge thereof, while the front plate portion B1 is shaped at the rear edge hereof to have a gradually rising lower surface correspondingly to the descending-sloped front edge. That is to say, the front plate portions B1 of a pair of chain links S do not interfere with each other even when they are slanted at any angles, respectively.

As shown, the chain link S for three-dimensional conveyor line according to the present invention includes a single-piece chain link body A made of a synthetic resin or any other appropriate, plate B, front bearing block C, and shaft pins D formed from a metal or any other appropriate material.

More particularly, the chain link body A consists of a linkage portion A1 and rear plate portion A2. The rear plate portion A2 has formed on the front top thereof a plate receiving concavity 6 in which the front plate portion B1 of the top plate B is received.

Note that the plate receiving concavity 6 is formed by cutting the front top portion of the rear plate portion A2 formed integrally on the pair of leg portions 2 of the link body A. When the front plate portion B1 is placed in the plate receiving concavity 6, it can be supported more stably there and the strength and rigidity of the entire link body A can be improved.

Also note that the rear plate portion A2 may not necessarily be formed integrally on the pair of leg portions 2 of the link body A and the front plate portion B1 may be shaped for mounting on the top of the pair of leg portions 2.

The top plate B consists of the front plate portion B1 and rear bearing block B2 formed integrally with the front plate portion B1. The rear bearing block B2 is shaped to have such a short, generally semi-cylindrical form, for example, that it is in sliding contact with the inner wall of the bearing space 5 in the projecting head portion 1. The front face of the rear bearing block B2 is in contact with the front bearing block C. The rear bearing block B2 has formed horizontally in the center of the front face thereof a generally semicircular shaft pin receiving groove 11 in which the shaft pin D is engaged. Also, the rear bearing block B2 has formed at the front lower portion (front upper portion or both front upper and lower portions) thereof an engagement projection 12 which is engaged with the front bearing block C to prevent the bearing blocks B2 and C from being vertically displaced in relation to each other.

Note that in the illustrated embodiment, the front plate portion B1 is placed in the plate receiving concavity 6 of the rear plate portion A2 and the rear plate portion A2 slides at the lower right and left surfaces thereof on a track rail or the like. So, any highly abrasion-resistant material used to form the front plate portion B1 will not have any influence of the movement of the chain link S on the track rail.

The rear bearing block B2 is also shaped to have such a short, generally semi-cylindrical form, for example, that it is in sliding contact with the front inner wall of the bearing space 5 in the projecting head portion 1. The rear face of the front bearing block C is in contact with the rear bearing block B2. The front bearing block C has formed horizontally in the center of the rear face thereof a generally semicircular shaft pin receiving groove 15 in which the shaft pin D is engaged. Also, the front bearing block C has formed at the rear lower portion (at the rear upper portion or at both rear upper and lower portions) thereof an engagement concavity 16 in which the engagement projection 12 is engaged to prevent the bearing blocks C and B2 from being vertically displaced in relation to each other.

Note that the engagement concavity 16 and engagement projection 12 may be swapped with each other, that is, on the front and rear bearing blocks C and B2, respectively, and their dimensions, shape, location, number, etc. may freely be set within the scope of the present invention.

Figure 7:
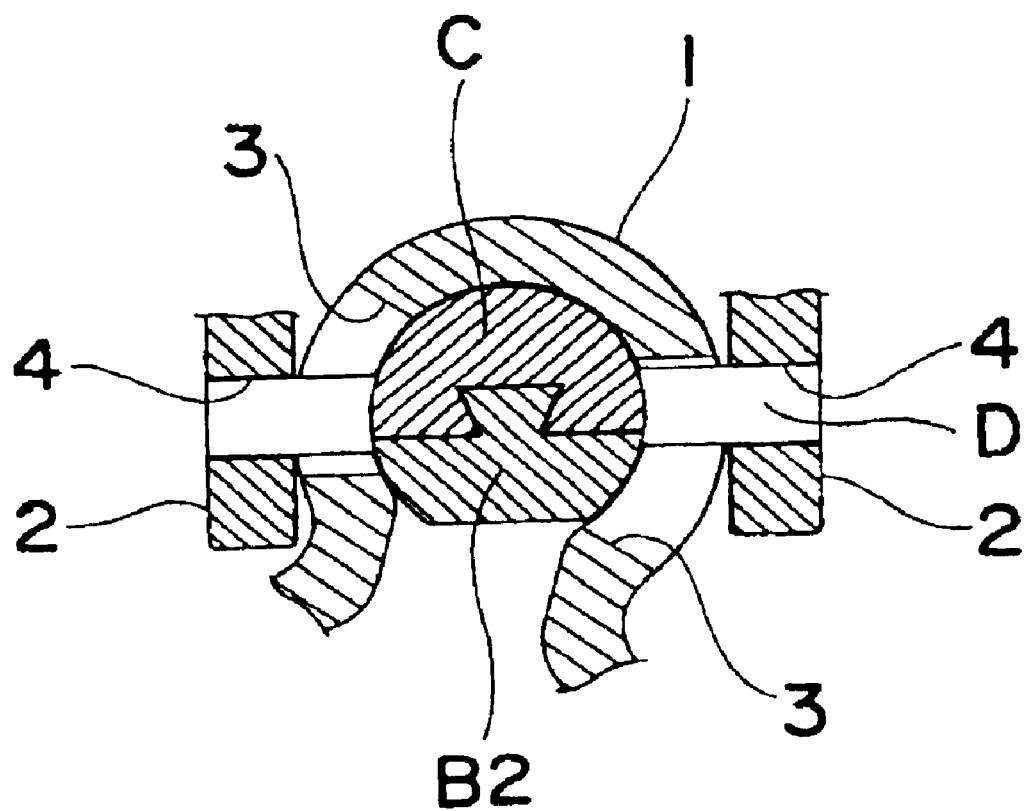
FIG. 7 is a fragmentary sectional, plan view of the conveyor chain in FIG. 1.

The engagement concavity 16 of the front bearing block C and engagement projection 12 of the rear bearing block B2 may be a dovetail and dovetail groove, respectively (as shown in FIG. 7), or a combination of a dovetail and dovetail groove or they may freely be shaped correspondingly to an intended purpose.

The shaft pin D is shaped to have a generally cylindrical form of which the rear side is flat and of which the right and left ends are so shaped that the shaft pin D will not easily be disengaged from through-holes 4 formed in the pair of leg portions 2 once fitted at the ends thereof in the through-holes 4.

Note that the embodiment of the present invention having been illustrated and described in the foregoing is a preferred one and the shape, size, material, disposition, etc. of each of the components may be modified in various manners without departing from the spirit of the present invention and scope of the claims given later.

Industrial Applicability

As having been described in the foregoing, the present invention has solved the technical problems of the conventional art such as thrust-up, stalling or overturning of the product being conveyed, which is likely to take place during oblique running of the conveyor line or engagement of the chain on the sprocket, by providing the conveyor chain according to the present invention, which has a relatively wide conveying surface, can smoothly convey a product, is easy to produce, suitable for mass production and highly durable. The present invention provides a conveyor chain suitable for building a three-dimensional conveyor line to convey beverages, foods, pharmaceuticals or other products.

What is claimed is:

1. A conveyor chain for a three-dimensional conveyor line, in which a plurality of chain links each with a top plate provided on a link body thereof are connected endlessly to each other by shaft pins for three-dimensional conveyance of products, wherein:

the link body includes a projecting head portion projecting forward and having a bearing space defined by a curved inner wall, and a pair of leg portions projecting rearward;

the leg portions in a pair of one chain link have on of the shaft pins extending therein and fixed across them and the projecting head portion of a next chain link is disposed between the pair of leg portions;

the projecting head portion is shaped to freely be pivoted vertically about, and horizontally of, the shaft pin;

the top plate includes a front plate portion and rear plate portion, formed by dividing the top plate along a parting line being a semicircle whose center is substantially at the center of the projecting head portion in such a manner that the front plate portion has a generally semicircular shape while the rear plate portion is concave at the front end thereof correspondingly to the semicircular shape of the front plate portion;

the rear plate portion is integral with the rear upper portion of the link body while the front plate portion has on the lower front side thereof a bearing block projecting downward and which is received in the bearing space of the projecting head portion; and the bearing block has the shaft pin penetrated through it so that the bearing block is prevented from being disengaged from the bearing space and the rear plate portion can be pivoted to the right and left of the front plate portion;

wherein the bearing block formed on the lower side of the front plate portion consists of two parts, front and rear, the rear bearing block is formed integrally with the front plate portion while the front bearing block is formed separately from the front plate portion and front bearing block.

2. The conveyor chain as set forth in claim 1, wherein the front bearing block is formed from a low-abrasion or high oil-content material.

3. The conveyor chain as set forth in claim 1, the front plate portion and rear bearing block are formed from a high-coil content material or an elastic material.

4. The conveyor chain as set forth in claim 2, the front plate portion and rear bearing block are formed from a high-coil content material or an elastic material.

5. The conveyor chain as set forth in claim 1, wherein each chain link has projections formed at the front edge of the front plate portion and recesses formed in the rear edge of the rear plate portion to receive the projections, respectively.

* * * * *

UNITED STATES PATENT AND TRADEMARK OFFICE
CERTIFICATE OF CORRECTION

PATENT NO. : 6,758,328 B2
DATED : July 6, 2004
INVENTOR(S) : T. Arai et al.

It is certified that error appears in the above-identified patent and that said Letters Patent is hereby corrected as shown below:

Column 8,
Line 22, "on" should be -- one --.

Signed and Sealed this

First Day of March, 2005

JON W. DUDAS
*Director of the United States Patent and Trademark Office*